United States Patent [19]

Yanagihara

[11] Patent Number: 5,233,488
[45] Date of Patent: Aug. 3, 1993

[54] METHOD AND APPARATUS FOR DETECTING TRACKING ERRORS

[75] Inventor: Naofumi Yanagihara, Tokyo, Japan

[73] Assignee: Sony Corporation, Tokyo, Japan

[21] Appl. No.: 699,322

[22] Filed: May 13, 1991

[30] Foreign Application Priority Data

May 21, 1990 [JP] Japan ................................. 2-130746

[51] Int. Cl.⁵ ............................................. G11B 5/584
[52] U.S. Cl. ............................... 360/77.15; 360/77.14
[58] Field of Search ........................... 360/77.15, 77.14

[56] References Cited

U.S. PATENT DOCUMENTS

| 4,148,082 | 4/1979 | Okada et al. | 360/77.15 |
| 4,530,012 | 7/1985 | Kinjo | 360/77.15 |
| 5,119,249 | 6/1992 | Uchikoshi | 360/77.15 |
| 5,182,681 | 1/1993 | Yamazaki | 360/77.15 |

FOREIGN PATENT DOCUMENTS

| 138210 | 4/1985 | European Pat. Off. |
| 171266 | 2/1986 | European Pat. Off. |
| 219303 | 4/1987 | European Pat. Off. |

OTHER PUBLICATIONS

Patent Abstracts of Japan vol. 10, No. 76 (P-440)(2133) Mar. 26, 1986 & JP-A-60 214415 (Akai) Oct. 26, 1985.
Patent Abstracts of Japan vol. 9, No. 289 (P-405)(2012) Nov. 15, 1985 & JP-A-60 127556 (Matsushita) Jul. 8, 1985.

*Primary Examiner*—John S. Heyman
*Attorney, Agent, or Firm*—William S. Frommer; Alvin Sinderbrand

[57] ABSTRACT

Tracks scanned by a playback head are provided with a first signal recorded in every nth track, a second signal recorded in a track which precedes and is adjacent to each nth track and a third signal recorded in a track which follows and is adjacent to each nth track. When a preceding track is scanned, the second signal recorded therein is detected; and at a time delayed from the detection of that second signal, the first signal picked up as a crosstalk component is sensed. When a following track is scanned, the third signal recorded therein is detected; and at a time delayed from the detection of the third signal, the first signal picked up as a crosstalk component is sensed. The difference between the first signal sensed when a preceding track is scanned and the first signal sensed when a following track is scanned is indicative of a tracking error.

25 Claims, 4 Drawing Sheets

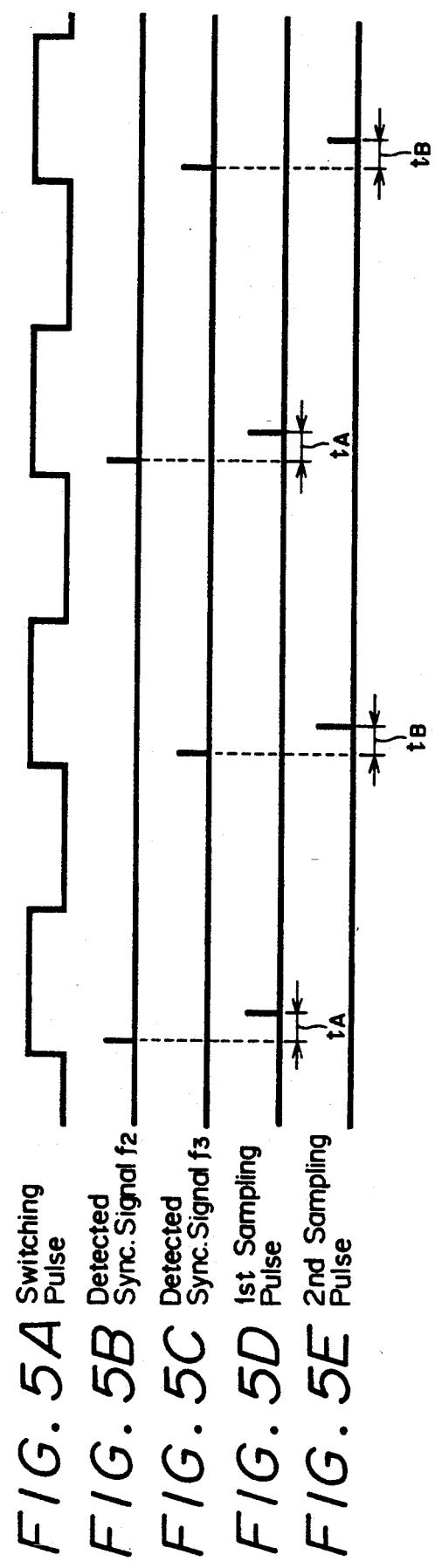
FIG. 5A Switching Pulse
FIG. 5B Detected Sync. Signal f2
FIG. 5C Detected Sync. Signal f3
FIG. 5D 1st Sampling Pulse
FIG. 5E 2nd Sampling Pulse

METHOD AND APPARATUS FOR DETECTING TRACKING ERRORS

BACKGROUND OF THE INVENTION

This invention relates to tracking error detection and, more particularly, to a method and apparatus for detecting a tracking error in a playback head which scans successive tracks across a record medium.

Tracking error control arrangements are known for controlling the position of one or more heads as those heads scan tracks previously recorded on a record medium. For example, in conventional video recording, video signals are recorded on a magnetic tape in successive slant tracks by a helical scan rotary head assembly. When the video signals are reproduced, either by the same head assembly or by different apparatus, the very same slant tracks that had been recorded must be followed accurately for proper signal reproduction and some form of tracking control generally is used for this purpose. Similar tracking control normally is provided when audio signals are recorded in slant tracks, such as in digital audio tape (DAT) recording.

In one type of tracking control arrangement, proper positioning of the heads with respect to the slant tracks is carried out with the assistance of a control signal recorded along a longitudinal edge of the magnetic tape. This longitudinally recorded control signal is reproduced by a stationary head; and tape movement is adjusted if there is a phase difference between the reproduced control signal and a position signal representing the rotary position of the heads. For example, proper positioning of a head relative to a track is indicated if the head position signal, which is produced when the head rotates to a predetermined position (e.g. to the beginning) of a track, coincides with a reproduced control signal. In the absence of coincidence, the tape is driven either faster or slower until the head is brought into proper alignment with a track, as represented by such coincidence.

A disadvantage of this conventional technique is the requirement of a stationary head which is dedicated to a single function. This head adds to the overall cost of the signal recording/playback apparatus and, more importantly, it impedes miniaturization of that apparatus. If the stationary head can be eliminated, the overall size of the apparatus can be reduced.

It has been proposed to mix tracking control signals with information signals in the same slant tracks. This has the advantage of eliminating the aforementioned stationary head and relies upon the transducer which reproduces useful information to reproduce the tracking control signals as well. Digital video and digital audio recording are particularly receptive to this approach because digital information signals are easily multiplexed with control signals without loss of useful information, they may be time base compressed easily and they may be readily processed. Hence, in a particular track, a tracking control signal may be recorded in a restricted region that normally is preceded and followed by digital information signals.

In one implementation of this proposal, a pilot signal of predetermined frequency is recorded in alternate tracks, and each pilot signal region is preceded and followed by digital signals. Advantageously, digital video and digital audio signals may be recorded in tracks having no guard bands between them. While this increases the amount of magnetic tape made available to record useful information, it also emphasizes the need for precise tracking control as playback heads scan the respective tracks. Typically, the heads used for recording and/or reproduction exhibit a gap length larger than the width of a track, which means that an edge of a preceding track is overwritten when the next adjacent track is recorded. This also means that when a playback head is in proper alignment with a prerecorded track, the signals recorded in both adjacent tracks are picked up as crosstalk components. This phenomenon of crosstalk pickup is used to detect tracking errors and to provide proper tracking control over the scanning heads.

In the arrangement mentioned above, wherein pilot signals of a predetermined frequency are recorded in restricted regions of alternate tracks, a pair of heads is used to scan two adjacent tracks substantially simultaneously. Hence, when one head scans the track in which the pilot signal is recorded, the other head scans the adjacent track which has no pilot signal therein. These two heads are mounted on the same rotary head assembly, such as a rotary head drum, and are relatively closely spaced thereon. The head which scans the track having no pilot signal therein will pick up, as a crosstalk component, the pilot signal recorded in an adjacent preceding track as well as the pilot signal recorded in an adjacent following track. If the magnitude of the crosstalk pilot signal picked up by this head from the preceding track is equal to the magnitude of the pilot signal picked up from the following track, the heads are in proper alignment with respect to the tracks scanned thereby. A tracking error is detected if the crosstalk pilot signal magnitudes from the preceding and following tracks differ from each other. In that event, the tape transport is accelerated or decelerated to bring the heads back into proper tracking alignment.

In the foregoing implementation, wherein pilot signals are recorded in restricted regions in alternate tracks, it will be appreciated that when a head scans a track having no pilot signal therein, the pilot signal recorded in the following track will be picked up as a crosstalk component before the pilot signal recorded in the preceding track is picked up. Assuming that the pilot signals are recorded in substantially equal regions in each track, it will be further appreciated that the pilot signals picked up as crosstalk components from the following and preceding tracks will be present concurrently for a significant period of time, and that the pilot signal picked up from the following track will terminate first. Thus, during the scan of a track in which no pilot signals are recorded, there will be distinct intervals of time during which the pilot signal is picked up as a crosstalk component from one adjacent track and then from the other. However, these time intervals are relatively short. Consequently, there is the possibility that the crosstalk pilot signal picked up from one of the adjacent tracks during such short interval may not be detected satisfactorily. Furthermore, this brief time interval is reduced if the track pitch is decreased; and a reduction in track pitch desirably leads to greater recording density. Consequently, if the recording medium is subjected to jitter, the time interval during which one crosstalk pilot signal is picked up may be so small as to inhibit adequate detection. Thus, a tracking error may not be properly sensed and tracking control is degraded.

OBJECTS OF THE INVENTION

Therefore, it is an object of the present invention to provide an improved tracking error detection technique which overcomes the aforenoted drawbacks and disadvantages of proposals made heretofore.

Another object of this invention is to maximize the duration during which a crosstalk pilot signal picked up from a track adjacent to the track being scanned may be detected.

Still another object of this invention is to provide an improved tracking error detection technique which operates satisfactorily even when the track pitch is reduced and even if the record medium being scanned is subjected to jitter.

Various other objects, advantages and features of the present invention will become readily apparent from the ensuing detailed description, and the novel features will be particularly pointed out in the appended claims.

SUMMARY OF THE INVENTION

In accordance with this invention, a technique is provided for detecting a tracking error in a transducer which scans tracks across a record medium having a first signal recorded in every nth track, a second signal recorded in a track which precedes and is adjacent to each nth track, and a third signal recorded in a track which follows and is adjacent to each nth track. When a preceding track is scanned, the second signal recorded therein is detected; and the first signal, picked up as a crosstalk component when this preceding track is scanned, is detected at a time delayed from the detection of the second signal. When a following track is scanned, the third signal recorded therein is detected; and the first signal, picked up as a crosstalk component when this following track is scanned, is detected at a time delayed from the detection of the third signal. A difference between the first signal detected when the preceding track is scanned and the first signal detected when the following track is scanned is sensed and provides a tracking error indication.

In a preferred embodiment, n=4. Also, the first signal is of a predetermined frequency and functions as a pilot signal, whereas the second and third signals exhibit frequencies different from the first signal and function as synchronizing signals. In one embodiment, the frequencies of the second and third signals are equal to each other, and in another embodiment these frequencies are different. In accordance with one aspect of this invention, the first, second and third signals are detected by sensing their respective frequencies.

As a feature of this invention, a sampling pulse is generated when the second signal is detected, and after being delayed this sampling pulse is used to sample the first signal picked up as a crosstalk component. Similarly, a sampling pulse is generated when the third signal is detected, and after being delayed this sampling pulse is used to sample the first signal picked up as a crosstalk component. A tracking error is determined by sensing the difference between these respective samples of the first signal. The delay imparted to the respective sampling pulses assures that the first signal, picked up as a crosstalk component, will be sampled at some point of the restricted region in which it is recorded. This delay may be increased or decreased, as desired, and permits accurate detection notwithstanding jitter, reduced track pitch or a particular pilot signal recording format.

BRIEF DESCRIPTION OF THE DRAWINGS

The following detailed description, given by way of example, will best be understood in conjunction with the accompanying drawings in which:

FIGS. 5A-5E are timing diagrams which are useful in understanding the operation of the present invention.

DETAILED DESCRIPTION OF A PREFERRED EMBODIMENT

Figure 1:
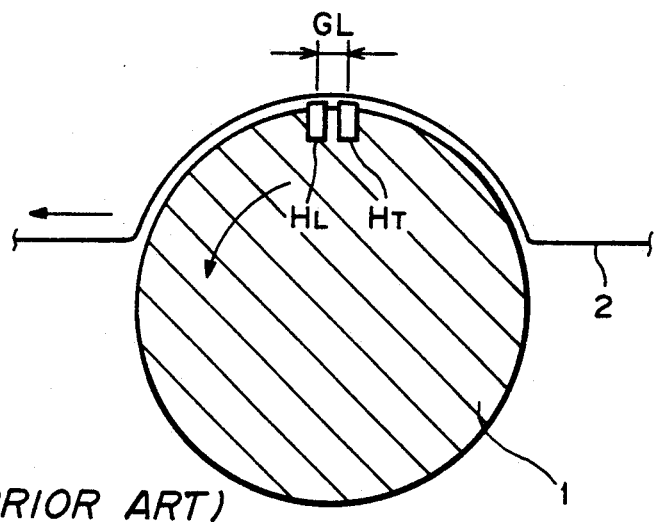
FIG. 1 is a schematic representation of a rotary head assembly that may be used both with the aforementioned prior proposal as well as with the present invention.

Before describing the present invention, a more detailed explanation of the aforementioned prior proposal of detecting tracking errors will be explained in conjunction with FIGS. 1 and 2. FIG. 1 is a schematic representation of a rotary head assembly wherein a pair of playback heads $H_L$ and $H_T$ are mounted on a rotary head drum 1 about which is partially wrapped a magnetic tape 2. Heads $H_L$ and $H_T$ are designated leading and trailing heads, respectively, and these heads are closely spaced so as to be angularly separated by a relatively short distance GL. In addition, and as will be best appreciated by reference to FIG. 2, heads $H_L$ and $H_T$ are offset from each other in the axial direction of drum 1. This offset is substantially equal to the pitch of the tracks scanned thereby. Although FIG. 1 illustrates tape 2 as being wrapped about a peripheral surface of drum 1 by an angular extent of more than 90°, it will be appreciated that this wrap angle may be much greater, for example, greater than 300° and preferably greater than 330°. As a result of a large wrap angle and closely spaced heads, the leading and trailing heads function to scan substantially simultaneously a pair of tracks at each rotation of drum 1. If the wrap angle is large enough, only two heads need be used to scan successive pairs of tracks.

The arrangement shown in FIG. 1, wherein a pair of heads is mounted on a rotatable drum in closely spaced but axially offset relationship offers significant advantages over previously proposed mounting arrangements wherein two heads are mounted 180° apart. Tracks which are recorded by diametrically opposed heads may not be in alignment with each other because the rotary movement of the drum to scan one head across the tape may not be precisely the same as the rotary movement thereof to scan the other head. This difficulty is, of course, avoided when the heads are closely spaced to each other because both heads will be subjected to the very same irregularities that may be present in the drum rotation. Hence, the scanning trace of head $H_L$ is practically identical to the scanning trace of head $H_T$, and the resultant tracks scanned thereby are in precise alignment. Good effects are achieved even if the track pitch is made very small.

Figure 2:
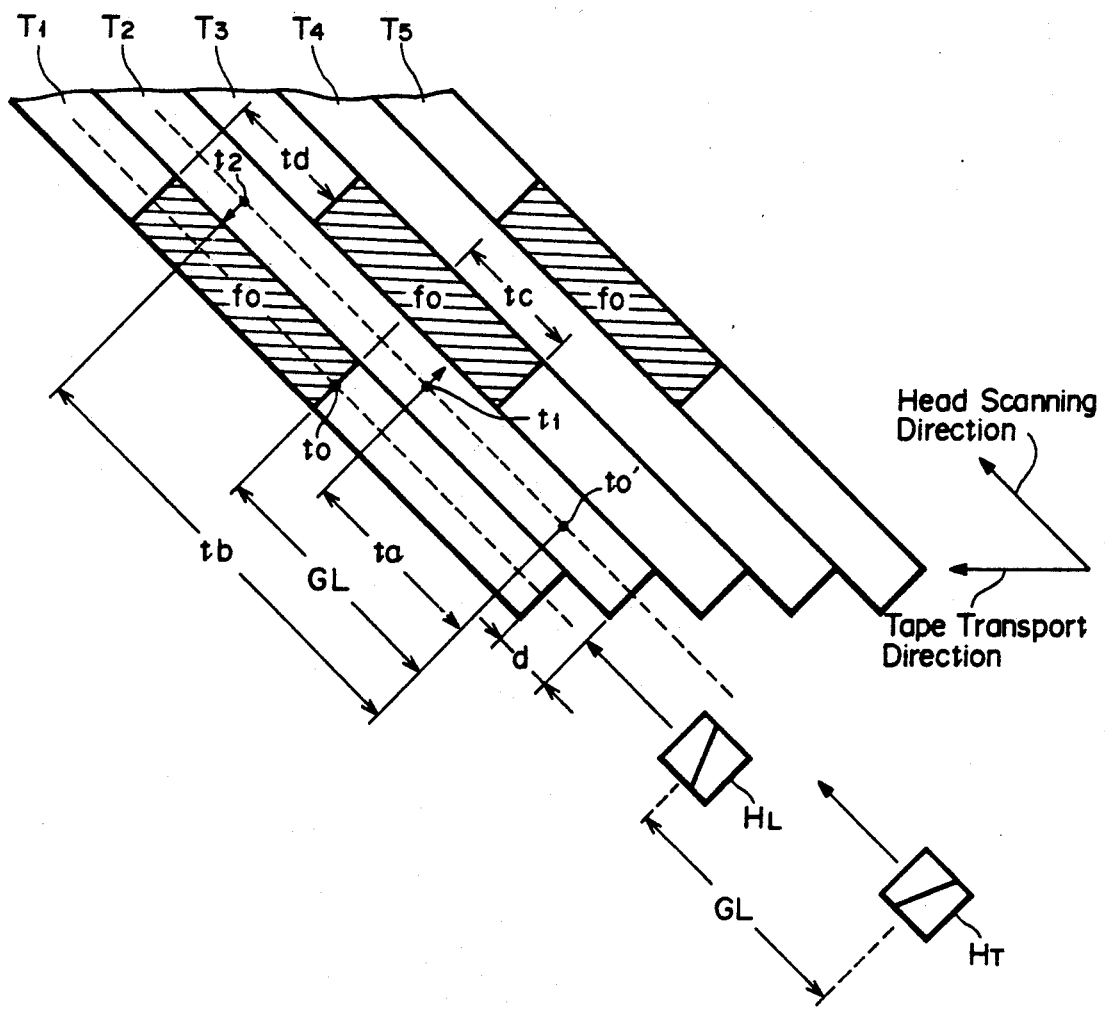
FIG. 2 is a schematic representation of recording tracks scanned by a pair of playback heads in accordance with the prior proposal mentioned above.

The track pattern scanned by heads $H_L$ and $H_T$ in FIG. 1 is illustrated schematically in FIG. 2. In this track pattern, the pilot signal of frequency $f_0$ is recorded in alternate tracks, such as in odd tracks $T_1$, $T_3$, $T_5$, etc. In accordance with the proposal made heretofore, the duration of the pilot signal is controlled such that the pilot signal is recorded in a restricted region in a track. The frequency of the pilot signal is on the order of several hundreds of kHz, but its frequency is such as to exhibit relatively small azimuth loss. As is typical in video recording, heads $H_L$ and $H_T$ exhibit different azimuths such that the phenomenon of azimuth loss minimizes the crosstalk component picked up by one head from a track that was recorded by a different head. For example, if it is assumed that leading head $H_L$ scans odd tracks $T_1$, $T_3$, $T_5$, etc. during both recording and reproducing operations, and if it also is assumed that trailing head $H_T$ scans the even tracks $T_2$, $T_4$, etc., during both recording and reproducing, then azimuth loss will minimize the signals picked up by head $H_L$ from adjacent even tracks and, similarly, azimuth loss will minimize the signals picked up by head $H_T$ from adjacent odd tracks. That is, when head $H_L$ scans track $T_3$ during a playback operation, azimuth loss will minimize the signals picked up as crosstalk components from tracks $T_2$ and $T_4$. Similarly, when head $H_T$ scans track $T_2$ during a playback operation, azimuth loss will minimize the crosstalk components picked up by head $H_T$ from tracks $T_1$ and $T_3$. However, the frequency of pilot signal $f_0$ is not subjected to significant azimuth loss and will be picked up as a crosstalk component by head $H_T$ when this head scans an even track.

When heads $H_L$ and $H_T$ scan the odd and even tracks, as illustrated in FIG. 2, pilot signal $f_0$ is reproduced when head $H_L$ reaches a point $t_0$ in track $T_1$. Because of the spacing GL between heads $H_L$ and $H_T$, head $H_T$ reaches point $t'_0$ in track $T_2$ when head $H_L$ first detects the pilot signal. It is seen that points $t_0$ and $t'_0$ are spaced apart by the distance GL, the same spacing exhibited between heads $H_L$ and $H_T$. It is recognized that, when head $H_L$ first detects the pilot signal, head $H_T$ is sufficiently distant therefrom as not to pick up a pilot signal crosstalk component, as yet. Rather, it is not until head $H_T$ advances to the position $t_1$ in track $T_2$ that a crosstalk pilot signal component will be picked up by this head from adjacent track $T_3$. It is seen that head $H_T$ reaches point $t_1$ at a delayed time $t_a$ from point $t'_0$. That is, at this delayed time $t_a$, head $H_T$ picks up a crosstalk pilot signal component from only one adjacent track, namely the right track $T_3$.

From FIG. 2, it is apparent that head $H_T$ reaches a portion of track $T_2$ whereat pilot signals $f_0$ are picked up as crosstalk components simultaneously from the left adjacent track $T_1$ and from the right adjacent track $T_3$. During the time that the pilot signal is picked up from both adjacent tracks, a determination cannot be made with respect to a tracking error. Hence, the tracking error detecting circuitry normally used with the arrangement shown in FIG. 2 is disabled or otherwise inhibited during the period of time that head $H_T$ picks up pilot signal crosstalk components from both tracks adjacent the track being scanned thereby.

When head $H_T$ reaches the point $t_2$ as it scans track $T_2$, the pilot signal crosstalk component picked up from the right adjacent track $T_3$ no longer is detected, and the pilot signal crosstalk component now is picked up from only the left adjacent track $T_1$. FIG. 2 illustrates that head $H_T$ arrives at point $t_2$ at a delayed time $t_b$ from point $t'_0$. Preferably, the pilot signal crosstalk component picked up from, for example, track $T_3$ is detected separately from the pilot signal crosstalk component picked up from track $T_1$. A tracking error is determined by sensing the difference between these separately detected pilot signal crosstalk components. For example, if the magnitude of one pilot signal crosstalk component exceeds the magnitude of the other, it is concluded that the heads are not properly centered on the tracks and the tape is accelerated or decelerated to effect a shifting in the heads relative to the tracks scanned thereby. Hence, tracking errors are corrected.

In the proposal represented by FIG. 2, a pilot signal of only one frequency is recorded in alternate tracks. However, as discussed above, the time interval during which the pilot signal may be detected by head $H_T$ as a crosstalk component picked up from only one adjacent track is relatively brief. For example, the pilot signal picked up from the right adjacent track is detected only during the relatively brief interval $t_c$, and the pilot signal picked up from the left adjacent track is detected only during the relatively brief interval $t_d$. Between these intervals, the pilot signal is picked up from both adjacent tracks. This brief interval $t_c$ or $t_d$ is a function of the difference d between the start of successive tracks. This difference d becomes smaller as the track pitch is reduced; and this results in decreasing the interval $t_c$ or $t_d$ during which the pilot signal may be detected from only one adjacent track. Indeed, this interval $t_c$ or $t_d$ may be expressed as follows:

$$t_c = t_d = \frac{2(v_T/f_D)\cos\phi}{v_R} \text{ [seconds]}$$

where $v_T$ is the speed at which the tape is transported, $f_D$ is twice the drum rotation rate, $\phi$ is the recording angle (that is, the angle of a track relative to the longitudinal direction of the tape) and $v_R$ is the speed of the head relative to the tape as both the head and tape move. As the time interval $t_c$ or $t_d$ is reduced, jitter in the tape movement may prevent accurate detection of the pilot signal picked up from an adjacent track, thus degrading the tracking error operation.

Figure 3:
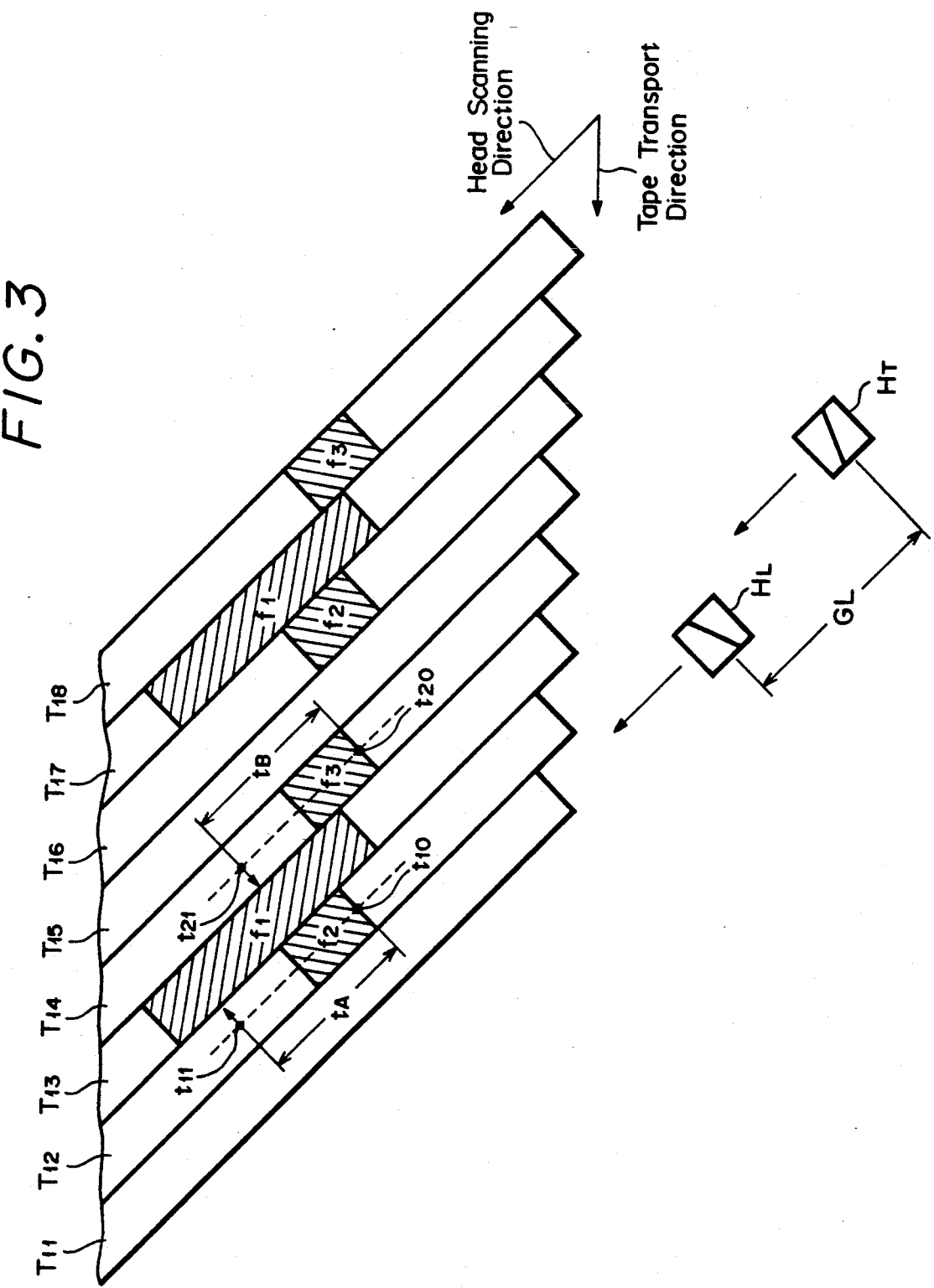
FIG. 3 is a schematic representation of recording tracks scanned by a pair of playback heads in accordance with the present invention.

The present invention overcomes this difficulty associated with the proposal shown in FIG. 2 by recording pilot and synchronizing signals in accordance with the track pattern shown in FIG. 3. It will be appreciated that heads $H_L$ and $H_T$, which are used to scan two adjacent tracks substantially simultaneously, may be mounted on a rotary drum consistent with the configuration shown in FIG. 1. Thus, the heads are closely spaced and offset from each other in the axial direction of the drum by an amount substantially equal to the pitch of the tracks. Furthermore, the heads exhibit different azimuth angles so as to attenuate crosstalk picked up from adjacent tracks, except that a pilot signal picked up as a crosstalk component will not be significantly attenuated.

In the embodiment illustrated in FIG. 3, it is assumed that head $H_L$ scans odd tracks $T_{11}$, $T_{13}$, $T_{15}$, etc. and head $H_T$ scans even tracks $T_{12}$, $T_{14}$, $T_{16}$, etc. A pilot signal $f_1$ of a frequency that is not significantly attenuated by azimuth loss is recorded in a restricted region in every nth track, where n is an even number equal to or greater than 4. In the preferred embodiment, as illustrated in FIG. 3, n=4. Thus, the pilot signal $f_1$ is recorded in tracks $T_{13}$, $T_{17}$, etc. The pilot signal is recorded for a predetermined duration and commences at a fixed interval from the beginning portion of the track in which it is recorded. A synchronizing signal $f_2$ is recorded in a restricted region in a track which precedes the track containing the pilot signal. Thus, synchronizing signal $f_2$ is recorded in tracks $T_{12}$, $T_{16}$, etc. The synchronizing signal exhibits a predetermined frequency different from the pilot signal frequency and preferably is greater than the pilot signal frequency so as to be subjected to azimuth loss. The duration of the synchronizing signal is not critical, and in the illustrated embodiment this duration is less than the duration during which pilot signal $f_1$ is recorded. As will be appreciated below, the length and position of synchronizing signal $f_2$ is such that, after the signal is detected by, for example, head $H_T$, the pilot signal $f_1$ is picked up as a crosstalk component by this head.

Similarly, a synchronizing signal $f_3$ is recorded in a restricted region in a track which follows and is adjacent to each track in which the pilot signal is recorded. As shown, synchronizing signal $f_3$ is recorded in tracks $T_{14}$, $T_{18}$, etc. The synchronizing signal preferably is of a frequency higher than the frequency of pilot signal $f_1$ and, thus, is subject to azimuth loss. In one embodiment, the synchronizing signals $f_2$ and $f_3$ are of the same frequency. In an alternative embodiment, the frequencies of these synchronizing signals differ from each other. The duration of synchronizing signal $f_3$ and its particular location relative to the pilot signal recorded in the adjacent track are not critical; however, it will become apparent that synchronizing signal $f_3$ is located such that after it is detected by, for example, head $H_T$, this head picks up pilot signal $f_1$ as a crosstalk component. In the illustrated embodiment, the duration of synchronizing signal $f_3$ is shorter than that of pilot signal $f_1$.

It will be recognized that in those regions of each track which precede and follow a respective pilot or synchronizing frequency, useful information is recorded, such as digital video or digital audio information. Of course, useful information is recorded in substantially the entire length of those tracks having neither a pilot signal nor a synchronizing signal recorded therein. As illustrated, tracks $T_{11}$, $T_{15}$, etc., have such useful information recorded therein.

Figure 4:
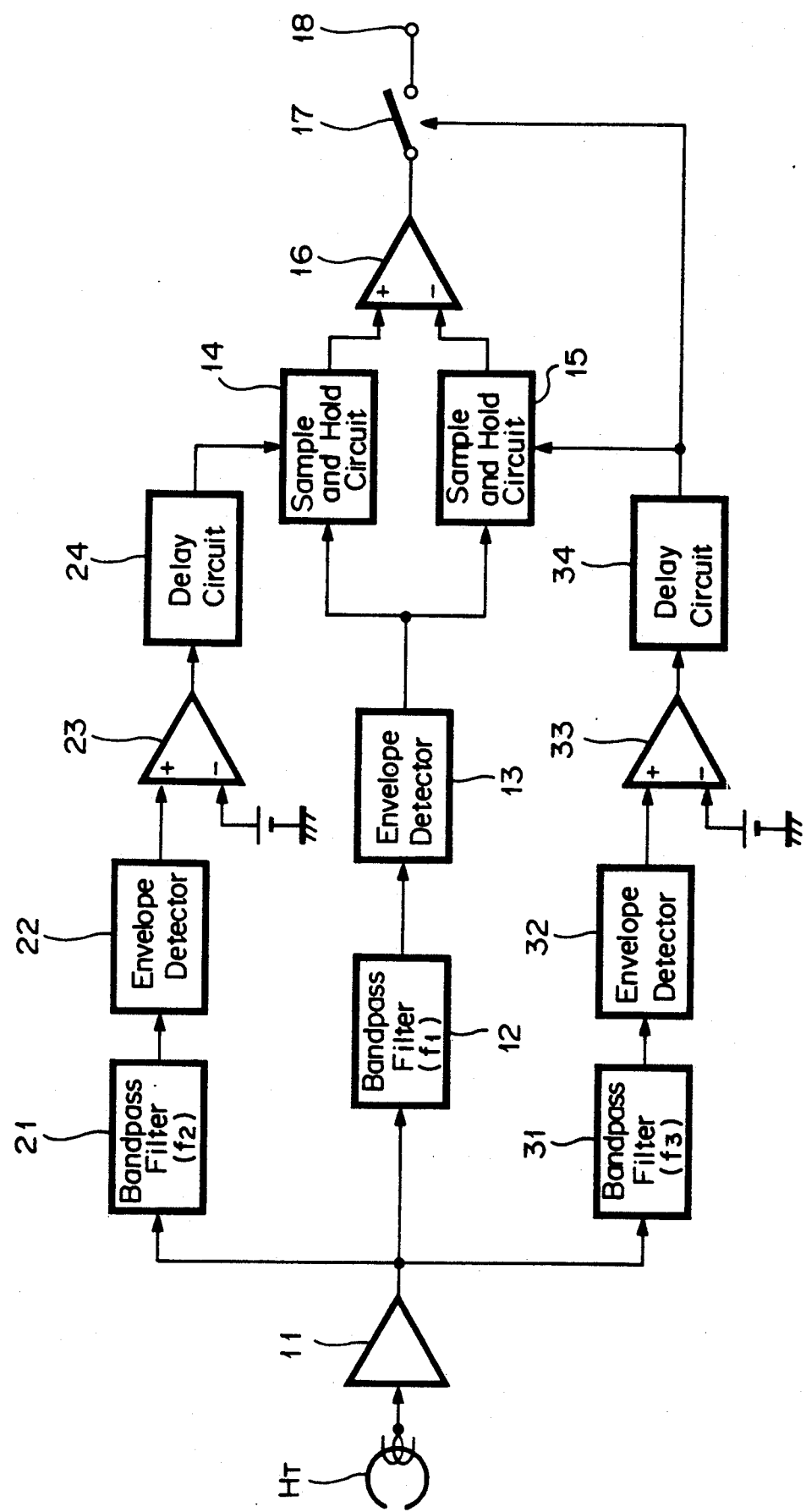
FIG. 4 is a block diagram of a preferred embodiment of apparatus in accordance with the present invention.

One embodiment of apparatus for detecting a tracking error from the pilot and synchronizing signal pattern illustrated in FIG. 3 is shown as a block diagram in FIG. 4. For the purpose of this description, it is assumed that head $H_T$ scans the even tracks to reproduce the synchronizing signals $f_2$ and $f_3$ and to pick up pilot signal $f_1$ as a crosstalk component. It will be appreciated, however, that head $H_L$ may be used to record and reproduce these even tracks.

The tracking error detector shown in FIG. 4 is comprised of individual signal detectors connected in common to head $H_T$ by a playback preamplifier 11. These detectors include a synchronizing signal detector adapted to detect synchronizing signal $f_2$, a synchronizing signal detector adapted to detect synchronizing signal $f_3$ and a pilot signal detector adapted to detect pilot signal $f_1$. To discriminate these signals reproduced or picked up by head $H_T$, filters are used, each tuned to a respective frequency and thus operable to pass either synchronizing signal $f_2$, synchronizing signal $f_3$ or pilot signal $f_1$. These filters are illustrated as band pass filters having center frequencies tuned to the frequency of the particular signal adapted to be passed thereby.

The pilot signal detector is comprised of a band pass filter 12 coupled to the output of preamplifier 11 and adapted to pass the pilot signal frequency. The output of the band pass filter is coupled to an envelope detector 13 which produces a signal whose amplitude is proportional to the magnitude of the pilot signal picked up by head $H_T$ as a crosstalk component. The detected envelope of the pilot signal is supplied in common to sample-and-hold circuits 14 and 15 which function to sample the pilot signal envelope. The sampling pulses used by these sample-and-hold circuits are generated by the synchronizing signal detectors, as will be described. A difference circuit 16, such as a comparator, is coupled to the sample-and-hold circuits 14 and 15 to determine the difference between the pilot signal samples produced thereby. This difference is indicative of a tracking error and is supplied to an output terminal 18 by way of a switch 17. This switch is adapted to be closed by a sampling pulse generated by one of the synchronizing signal detectors.

The synchronizing signal detector adapted to detect synchronizing signal $f_2$ includes a band pass filter 21 which is coupled to the output of preamplifier 11 and is tuned to the frequency of this synchronizing signal. The envelope of the synchronizing signal passed by band pass filter 21 is detected by an envelope detector 22, and the level of the detected envelope is compared to a reference level by a comparator 23. It will be appreciated that comparator 23 functions as a threshold circuit and is adapted to generate an output pulse when the envelope of synchronizing signal $f_2$ exceeds the threshold level represented by the reference signal supplied to this comparator. The pulse produced by comparator 23 is coupled to sample-and-hold circuit 14 as a sampling pulse after being delayed by a delay circuit 24. The delay circuit imparts a predetermined time delay to the sampling pulse generated by comparator 23 for a purpose soon to be described.

The synchronizing signal detector adapted to detect synchronizing signal $f_3$ is of substantially the same construction as the synchronizing signal detector used to detect synchronizing signal $f_2$. As shown, a band pass filter 31, tuned to the frequency of synchronizing signal $f_3$, is coupled to the output of preamplifier 11 and is adapted to pass synchronizing signal $f_3$ to an envelope detector 32. The envelope of synchronizing signal $f_3$, which represents the magnitude thereof, is compared by a comparator 33 to a threshold level supplied thereto by a reference signal source. The comparator functions as a threshold detector to produce a sampling pulse when the envelope of synchronizing signal $f_3$ exceeds this threshold. The sampling pulse generated by comparator 33 is supplied to sample-and-hold circuit 15 via a delay circuit 34. This sampling pulse also is used to close output switch 17.

It will be appreciated that, for the embodiment wherein the frequencies of both synchronizing signals are the same, band pass filters 21 and 31 may be substantially identical. Conversely, if the frequencies of these synchronizing signals differ from each other, the center frequencies of the respective band pass filters likewise differ from each other. Still further, delays imparted by delay circuits 24 and 34 to the sampling pulses generated by comparators 23 and 33, respectively, may be equal. As mentioned above, the purpose of these delays is discussed below, and it will become apparent that such delays need not be equal to each other.

The manner in which the tracking error detector shown in FIG. 4 operates now will be described in conjunction with FIG. 3 and the timing diagrams of FIGS. 5A-5E. Let it be assumed that head $H_L$ scans the odd tracks shown in FIG. 3 and that head $H_T$ scans the even tracks. FIG. 5A is a timing waveform representing a switching pulse, and it is assumed that heads $H_L$ and $H_T$ begin the scanning of their respective tracks at the positive transition of the switching pulse. It will be appreciated that the period of the switching pulse corresponds to the rotational period of head drum 1 and that the wrap angle of tape 2 deployed about the drum is such that the pair of heads $H_L$ and $H_T$ scan successive pairs of tracks across the tape. Thus, these heads scan track pairs $T_{11}$, $T_{12}$; $T_{13}$, $T_{14}$; $T_{15}$, $T_{16}$; etc. In the illustrated embodiment, the synchronizing and pilot signals are recorded in their respective tracks at the vicinity of the beginning portion of such tracks. Useful information may precede as well as follow the restricted regions in which these respective synchronizing and pilot signals are recorded.

When head $H_T$ scans track $T_{12}$, synchronizing signal $f_2$ is detected when the head reaches point $t_{10}$. The synchronizing signal reproduced by this head is passed to envelope detector 22 by band pass filter 21 and compared to a threshold level by comparator 23. Assuming that the magnitude of the synchronizing signal exceeds this threshold level, comparator 23 generates an output pulse as shown in FIG. 5B.

As head $H_T$ scans track $T_{12}$, the pilot signal $f_1$ recorded in the right adjacent track $T_{13}$ is picked up and is passed by band pass filter 12. The magnitude of this pilot signal crosstalk component is detected by envelope detector 13 and is supplied to sample-and-hold circuit 14. From the track pattern shown in FIG. 3, it is expected that the pilot signal is picked up before synchronizing signal $f_2$ is detected, and this pilot signal is continuously picked up for a substantial period of time, even after head $H_T$ passes beyond synchronizing signal $f_2$. Delay circuit 24 delays the sampling pulse shown in FIG. 5B by a time delay $t_A$ such that when head $H_T$ reaches point $t_{11}$ (shown in FIG. 3), the delayed sampling pulse is generated, as represented by the timing waveform of FIG. 5D. If this time delay $t_A$ is greater than the interval during which synchronizing signal $f_2$ is reproduced, interference between this synchronizing signal and the pilot signal crosstalk component is avoided. At the delayed time $t_A$, that is, when head $H_T$ reaches point $t_{11}$, the pilot signal magnitude supplied by envelope detector 13 to sample-and-hold circuit 14 is sampled. This pilot signal sample is held at least until sample-and-hold circuit 15 is operated. In any event, the sample held by sample-and-hold circuit 14 may be reset prior to the next sampling operation thereof.

Now, when heads $H_L$ and $H_T$ scan the next track pair, shown as tracks $T_{13}$ and $T_{14}$, a similar operation is carried out with the synchronizing signal detector used to detect synchronizing signal $f_3$. That is, when head $H_T$ now reaches synchronizing signal $f_3$ in track $T_{14}$, as represented by point $t_{20}$, this synchronizing signal is reproduced, passed to envelope detector 32 by band pass filter 31 and compared to a threshold level by comparator 33. Assuming that the magnitude of synchronizing signal $f_3$ exceeds this threshold level, comparator 33 generates a sampling pulse as illustrated in FIG. 5C. At this time, head $H_T$ has not yet reached the vicinity of the region in which pilot signal $f_1$ is recorded. Hence, a pilot signal crosstalk component is not yet picked up from adjacent track $T_{13}$. Of course, as the head continues its scan of track $T_{14}$, this pilot signal crosstalk component will be picked up.

Delay circuit 34 delays the sampling pulse produced by comparator 33 by a time delay $t_B$, as illustrated in FIG. 5E. Accordingly, the delayed sampling pulse is produced by delay circuit 34 when head $H_T$ reaches point $t_{21}$ in track $T_{14}$, as shown in FIG. 3. At this time, the head has passed beyond synchronizing signal $f_3$ and picks up pilot signal $f_1$ as a crosstalk component from adjacent track $T_{13}$. It will be seen that, at point $t_{21}$, there is no interference between the pilot signal and synchronizing signal $f_3$. This delayed sampling pulse now samples the magnitude of the pilot signal crosstalk component picked up from adjacent track $T_{13}$. This sample of the pilot signal, produced when head $H_T$ scans the right adjacent track $T_{14}$ now is compared to the sample of the pilot signal crosstalk component picked up when head $H_T$ scanned the left adjacent track $T_{12}$, which sample is stored in sample-and-hold circuit 14. Any difference between these pilot signal samples is determined by difference circuit 16 and supplied to output terminal 18 as a tracking error indication. Sample-and-hold circuit 15 may be reset before the next sampling operation thereof.

Thus, a pilot signal sample produced when head $H_T$ scans the track which precedes and is adjacent to track $T_{13}$ in which pilot signal $f_1$ is recorded is compared to the pilot signal sample produced when this head scans the track which follows and is adjacent to track $T_{13}$. If the heads exhibit proper track alignment, the magnitudes of these samples will be equal. However, if the alignment of the heads is left-of-center, the pilot signal sample produced when the following track $T_{14}$ is scanned will be greater than the pilot signal sample produced when the preceding track $T_{12}$ is scanned, resulting in a tracking error indication. The tracking error signal produced at output terminal 18 is supplied to a servo circuit (not shown) which, for example, controls the operation of a capstan motor to transport the magnetic tape in a manner to correct this tracking error. Conversely, if the pilot signal sample produced when head $H_T$ scans the preceding track $T_{12}$ is greater than the pilot signal sample produced when the head scans the following track $T_{14}$, it is concluded that the alignment of the heads is right-of-center; and the tracking error signal produced by difference circuit 16 is indicative thereof. The aforementioned servo circuit responds to this tracking error signal to control the tape transport and thereby correct the tracking error.

From the foregoing, it will be seen that the detection of the crosstalk pilot signal is not dependent upon the track format, as is the case in the arrangement shown in FIG. 2. Hence, the duration of the time period during which the crosstalk pilot signal is picked up and detected is relatively longer than that discussed above in conjunction with FIG. 2. Consequently, the possibility of jitter will not prevent proper detection of the pilot signal crosstalk component.

In the embodiment discussed with reference to FIGS. 3 and 4, it has been assumed that the frequencies of synchronizing signals $f_2$ and $f_3$ differ from each other. As an alternative, these frequencies may be equal. Of course, when a synchronizing signal is detected, it must be known whether the track in which this synchronizing signal is recorded precedes or follows the track in which the pilot signal is recorded. But, since head $H_L$ scans the track in which the pilot signal is recorded during the same pass that head $H_T$ scans the following, adjacent track, the determination of whether the head $H_T$ is scanning the preceding or following track is easily determined. That is, it is known that head $H_T$ scans a preceding track if head $H_L$ does not reproduce the pilot signal; and it is known that head $H_T$ scans the following track when head $H_L$ reproduces the pilot signal.

While the present invention has been particularly shown and described with reference to a preferred embodiment, it will be readily appreciated by those of ordinary skill in the art that various changes and modifications may be made without departing from the spirit and scope of the invention. Some of these changes have been discussed above. In addition to those, the configuration of the heads mounted on drum 1 need not be limited solely to the representation shown in FIG. 1. If the drum and tape movements can be controlled sufficiently so as to exhibit accurate scanning, the heads may be mounted 180° apart, provided that the heads are capable of reproducing the synchronizing and pilot signals recorded in the pattern shown in FIG. 3. That is, such diametrically opposed heads may be used, whereby one head scans odd tracks $T_{11}$, $T_{13}$, $T_{15}$, etc. and the other head scans even tracks $T_{12}$, $T_{14}$, $T_{16}$, etc.

It is intended that the appended claims be interpreted as including the embodiment described herein, those alternatives which have been discussed above and all equivalents.

What is claimed is:

1. A method of detecting a tracking error in a playback head which scans tracks across a record medium having a first signal recorded in a restricted region n every nth track where n is even integer at least equal to 4 a second signal recorded in a restricted region in a track which precedes and is adjacent to each track in which said first signal is recorded, and a third signal recorded in a restricted region in a track which follows and is adjacent to each track in which said first signal is recorded, said method comprising the steps of:

scanning a preceding track where n is an even integer at least equal to 4 by said playback head to reproduce the signals recorded therein and crosstalk components picked up from adjacent tracks;

detecting said second signal reproduced from the scanned preceding track;

detecting at a time delayed from the detection of said second signal the first signal reproduced by said playback head as a crosstalk component when said playback head scans said preceding track;

scanning a following track by said playback head to reproduce the signals recorded therein and crosstalk components picked up from adjacent tracks;

detecting said third signal reproduced from the scanned following track, detecting at a time delayed from the detection of said third signal the first signal reproduced by said playback head as a crosstalk component when said playback head scans said following track; and sensing a difference between the first signal detected when said playback head scans said preceding track and the first signal detected when said playback head scans said following track.

2. The method of claim 1 wherein n=4.

3. The method of claim 1 wherein said first signal is a pilot signal of predetermined frequency and said second and third signals exhibit frequencies different from said first frequency.

4. The method of claim 3 wherein the frequency of said second signal differs from the frequency of said third signal.

5. The method of claim 3 wherein the frequency of said second signal is equal to the frequency of said third signal.

6. The method of claim 3 wherein each step of detecting comprises sensing the respective frequency of said first, second and third signals.

7. The method of claim 6 wherein said step of detecting the first signal when said playback head scans said preceding track comprises filtering the frequency of said first signal, generating a first sampling pulse at a predetermined time delay from the sensing of the frequency of said second signal, and using said first sampling pulse to sample the filtered first signal.

8. The method of claim 7 wherein said step of detecting the first signal when said playback head scans said following track comprises filtering the frequency of said first signal, generating a second sampling pulse at a predetermined time delay from the sensing of the frequency of said third signal, and using said second sampling pulse to sample the filtered first signal.

9. The method of claim 8 wherein said step of sensing a difference comprises holding samples of the filtered first signal sampled by the respective first and second sampling pulses, and obtaining the difference between the held samples.

10. The method of claim 9 wherein said step of sensing a difference further comprises providing as an output signal representative of a tracking error the difference between the held samples in response to said second sampling pulse.

11. Apparatus for detecting a tracking error in transducer means which scans tracks across a record medium having a first signal recorded in every nth track, a second signal recorded in a track which precedes and is adjacent to each nth track, and a third signal recorded in a track which follows and is adjacent to each nth track, said apparatus comprising:

second signal detecting means for detecting said second signals when said transducer means scans a preceding track;

third signal detecting means for detecting said third signal when said transducer means scans a following track;

first signal detecting means operable when said transducer means scans said preceding track to detect, at a time delayed from the detection of said second signal, the first signal picked up as a crosstalk component by said transducer means, and operable when said transducer means scans said following track to detect, at a time delayed from the detection of said third signal, the first signal picked up as a crosstalk component by said transducer means; and sensing means for sensing a difference between the first signal detected by said first signal detecting means when said transducer means scans said preceding track and the first signal detected by said first signal detecting means when said transducer means scans said following track.

12. The apparatus of claim 11 wherein n=4.

13. The apparatus of claim 11 wherein said first signal is a pilot signal of predetermined frequency and said second and third signals exhibit frequencies different from said first frequency.

14. The apparatus of claim 13 wherein the frequency of said second signal differs from the frequency of said third signal.

15. The apparatus of claim 13 wherein the frequency of said second signal is equal to the frequency of said third signal.

16. The apparatus of claim 13 wherein each of said detecting means includes frequency sensing means for sensing the respective frequency of said first, second and third signals.

17. The apparatus of claim 13 wherein said first signal detecting means comprises filtering means tuned to the frequency of said first signal for filtering said first signal, first sampling pulse generating means for generating a first sampling pulse at a predetermined time delay from the detection of said second signal, second sampling pulse generating means for generating a second sampling pulse at a predetermined time delay from the detection of said third signal, and sampling means for sampling the filtered first signal with said first and second sampling pulses.

18. The apparatus of claim 17 wherein said sampling means comprises first sample-and-hold means responsive to said first sampling pulse for sampling and holding the filtered first signal, and second sample-and-hold means responsive to said second sampling pulse for sampling and holding the filtered first signal.

19. The apparatus of claim 18 wherein said sensing means comprises difference means coupled to said first and second sample-and-hold means for obtaining a difference between the samples held thereby.

20. The apparatus of claim 19 wherein each of said second and third signal detecting means includes filter means tuned to a respective frequency of the second and third signals for filtering said respective second or third signal.

21. The apparatus of claim 20 wherein each of said first and second sampling pulse generating means includes envelope detecting means for detecting an envelope of the respective second or third signal, comparator means for generating a sampling pulse if the detected envelope exceeds a predetermined level, and delay means for delaying the generated sampling pulse.

22. The apparatus of claim 19 wherein said sensing means further includes output switch means responsive to said second sampling pulse for providing said difference between the samples as a tracking error signal.

23. The apparatus of claim 11 wherein said transducer means comprises one of a pair of closely spaced playback heads operable to scan two adjacent tracks substantially concurrently.

24. The apparatus of claim 23 wherein the pair of playback heads exhibit different azimuth angles.

25. The apparatus of claim 23 wherein said transducer means comprises a rotary head drum rotatable about an axis thereof, and said pair of playback heads are mounted on said drum offset from each other in the axial direction by an amount substantially equal to the pitch of said tracks.

* * * * *